United States Patent
Evoy et al.

(10) Patent No.: US 7,983,888 B2
(45) Date of Patent: Jul. 19, 2011

(54) SIMULATION CIRCUIT OF PCI EXPRESS ENDPOINT AND DOWNSTREAM PORT FOR A PCI EXPRESS SWITCH

(75) Inventors: David R. Evoy, Chandler, AZ (US); Jerry Michael Rose, Phoenix, AZ (US)

(73) Assignee: NXP B.V., Eindhoven (NL)

( * ) Notice: Subject to any disclaimer, the term of this patent is extended or adjusted under 35 U.S.C. 154(b) by 853 days.

(21) Appl. No.: 10/592,191

(22) PCT Filed: Mar. 21, 2005

(86) PCT No.: PCT/IB2005/050966
§ 371 (c)(1),
(2), (4) Date: Jan. 18, 2008

(87) PCT Pub. No.: WO2005/091154
PCT Pub. Date: Sep. 29, 2005

(65) Prior Publication Data
US 2008/0256284 A1  Oct. 16, 2008

Related U.S. Application Data

(60) Provisional application No. 60/554,505, filed on Mar. 19, 2004.

(51) Int. Cl.
*G06F 17/50* (2006.01)
*G06F 13/40* (2006.01)

(52) U.S. Cl. .......................................... 703/14; 710/316

(58) Field of Classification Search .................... 703/13, 703/14; 370/463; 710/316; 713/300
See application file for complete search history.

(56) References Cited

U.S. PATENT DOCUMENTS

| | | | |
|---|---|---|---|
| 6,141,719 A | 10/2000 | Rafferty et al. | |
| 6,279,060 B1 | 8/2001 | Luke et al. | |
| 6,339,751 B1 | 1/2002 | Takeda et al. | |
| 7,320,080 B2 * | 1/2008 | Solomon et al. | 713/320 |
| 7,743,390 B2 * | 6/2010 | Cheng | 719/327 |
| 2001/0025235 A1 | 9/2001 | Otsuka | |
| 2004/0003154 A1 | 1/2004 | Harris et al. | |
| 2004/0003159 A1 * | 1/2004 | Kumar et al. | 710/302 |
| 2005/0147117 A1 * | 7/2005 | Pettey et al. | 370/463 |
| 2006/0161793 A1 * | 7/2006 | Orr | 713/300 |
| 2006/0227768 A1 * | 10/2006 | Sauber et al. | 370/360 |

FOREIGN PATENT DOCUMENTS

| | | |
|---|---|---|
| CN | 1458766 A | 11/2003 |
| EP | 0 640 927 A1 | 3/1995 |
| EP | 1 133 108 A1 | 9/2001 |
| JP | 7-226750 A | 8/1995 |
| JP | 11-96196 A | 4/1999 |

(Continued)

OTHER PUBLICATIONS

Fuller, S. "RapidIO Und PCI Express Ahnlich Und Doch so Unterschiedlich," Elektronik, Franzis Verlag GmbH, vol. 52, No. 5, pp. 76-80 (May 2003).

(Continued)

*Primary Examiner* — Russell Frejd

(57) ABSTRACT

Single hardware subsystems that present two software views that appear to be two separate hardware subsystems attached in a hierarchy are implemented with PCI arrangements. In an embodiment, a hardware arrangement is configured to emulate two virtually separate hierarchical subsystems in a single hardware block. This emulation facilitates the coupling of devices to PCI Express communications links while addressing PCI-Express linking requirements for such devices.

20 Claims, 8 Drawing Sheets

FOREIGN PATENT DOCUMENTS

| | | |
|---|---|---|
| JP | 2000-123063 A | 4/2000 |
| JP | 2001-298466 A | 10/2001 |
| JP | 2001-331346 A | 11/2001 |
| JP | 2004-38955 A | 2/2004 |
| WO | 03/063461 A1 | 7/2003 |

OTHER PUBLICATIONS

Wong, "Advanced Switching for PCI Express: The Future Looks 'Fabric' Fast," Electronic Design, Penton Publg., vol. 51, No. 14 (pp. 36, 38 (Jun. 23, 2003).

Mayhew, D. et al. "PCI Express and Advanced Switching: Evolutionary Path to Building Next Generation Interconnects," Proc. 11th Symp. on High Performance Interconnects, pp. 21-29 (Aug. 2003).

Zhu, et al. "Compositional Verification, an Industrial Case Study," Proc. 5th Int'l. Conf. on ASIC, pp. 282-285 (Oct. 2003).

Nejedlo, J. et. "IBIST (Interconnect Built-in-Self-Test) Architecture and Methodology for PCI Express," Proc. Int'l. Test Conf. 2003, paper 31.2, pp. 114-122 (2003).

International Preliminary Report on Patentability for International Patent Appln. No. PCT/IB2005/050966 (Sep. 19, 2006).

* cited by examiner

SIMULATION CIRCUIT OF PCI EXPRESS ENDPOINT AND DOWNSTREAM PORT FOR A PCI EXPRESS SWITCH

CROSS REFERENCE TO RELATED APPLICATION

This application claims the benefit of U.S. provisional application Ser. No. 60/554,505 filed Mar. 19, 2004, which is incorporated herein whole by reference.

The present invention relates generally to communications for processing type applications and, more particularly, to communication methods and arrangements using a PCI Express-type link.

PCI (Peripheral Component Interconnect) is an interconnection system between a microprocessor and attached devices in which expansion slots are spaced closely for high speed operation. Using PCI, a computer can support new PCI cards while continuing to support Industry Standard Architecture (ISA) expansion cards, which is an older standard. PCI is designed to be independent of microprocessor design and to be synchronized with the clock speed of the microprocessor. PCI uses active paths (on a multi-drop bus) to transmit both address and data signals, sending the address on one clock cycle and data on the next. The PCI bus can be populated with adapters requiring fast accesses to each other and/or system memory and that can be accessed by a host processor at speeds approaching that of the processor's full native bus speed. Read and write transfers over the PCI bus are implemented with burst transfers that can be sent starting with an address on the first cycle and a sequence of data transmissions on a certain number of successive cycles. The length of the burst is negotiated between the initiator and target devices and may be of any length. PCI-type architecture is widely implemented, and is now installed on most desktop computers PCI Express architecture exhibits similarities to PCI architecture with certain changes. PCI Express architecture employs a switch that replaces the multi-drop bus of the PCI architecture with a switch that provides fan-out for an input-output (I/O) bus. The fan-out capability of the switch facilitates a series of connections for add-in, high-performance I/O. The switch is a logical element that may be implemented within a component that also contains a host bridge. A PCI switch can logically be thought of, e.g., as a collection of PCI-to-PCI bridges in which one bridge is the upstream bridge that is connected to a private local bus via its downstream side to the upstream sides of a group of additional PCI-to-PCI bridges.

PCI Express is limited in application to endpoint type devices in that such devices are generally not allowed to exist on an internal bus. Specifically, PCI Express requires that endpoint devices (represented by Type 00h Configuration Space headers) do not appear to configuration software on the internal bus of a PCI Express switch as peers of the Virtual PCI-to-PCI Bridges representing the switch downstream ports. In addition, only the PCI-PCI Bridges representing the switch downstream ports may appear on the internal bus and endpoints, represented by Type 0 configuration space headers, may not appear on the internal bus.

These and other limitations present challenges to the implementation of integrated devices with PCI Express communications.

Various aspects of the present invention involve testing approaches for a variety of computer circuits, such as those including interconnect-type structure (e.g., PCI structure) and others. The present invention is exemplified in a number of implementations and applications, some of which are summarized below.

According to an example embodiment of the present invention, an endpoint device is configured and arranged to emulate a downstream port of a switch coupled to an endpoint device via a PCI Express-compliant link. The endpoint device is coupled to the bus of a PCI Express switch, with the emulation meeting compliance with PCI Express implementations restricting endpoint devices from being implemented on the bus. With this approach, one or more devices can exist within a PCI Express HUB with generally minimal added logic and without necessarily violating rules typically implemented with PCI Express that disallow integrated devices. In addition, this approach facilitates the implementation one or more devices within the PCI Express Hub while fully complying with the PCI Express requirements.

According to another example embodiment of the present invention, a PCI Express communications system facilitates the direct coupling of an endpoint device to a PCI Express-compliant link. The system includes a central processor arrangement and a PCI Express switch communicatively coupled with a host bridge. The PCI Express switch logically includes an upstream port, a bus and a plurality of downstream ports, the upstream port coupled to the host bridge and the down stream ports coupled to one or more PCI Express-type endpoint device. The PCI Express endpoint device and the downstream port to which it is coupled are included in a single circuit that emulates the downstream port and the PCI Express endpoint device coupled via a virtual link.

The above summary of the present invention is not intended to describe each embodiment or every implementation of the present invention. The above summary of the present invention is not intended to describe each illustrated embodiment or every implementation of the present invention. The figures and detailed description that follow more particularly exemplify these embodiments.

The invention may be more completely understood in consideration of the following detailed description of various embodiments of the invention in connection with the accompanying drawings, in which:

FIGS. 4A-4C show a software view of an integrated PCI Express endpoint device, wherein:

FIG. 4A shows a block-level software view of a single integrated device that simulates two blocks coupled via a virtual link, according to an example embodiment of the present invention;

FIG. 4B shows a detailed software view of various layers and registers for the device shown in FIG. 4A, according to another example embodiment of the present invention; and FIG. 4C shows an implementation view of virtual link configuration registers for the device shown in FIG. 4A, according to another example embodiment of the present invention;

Figure 1:
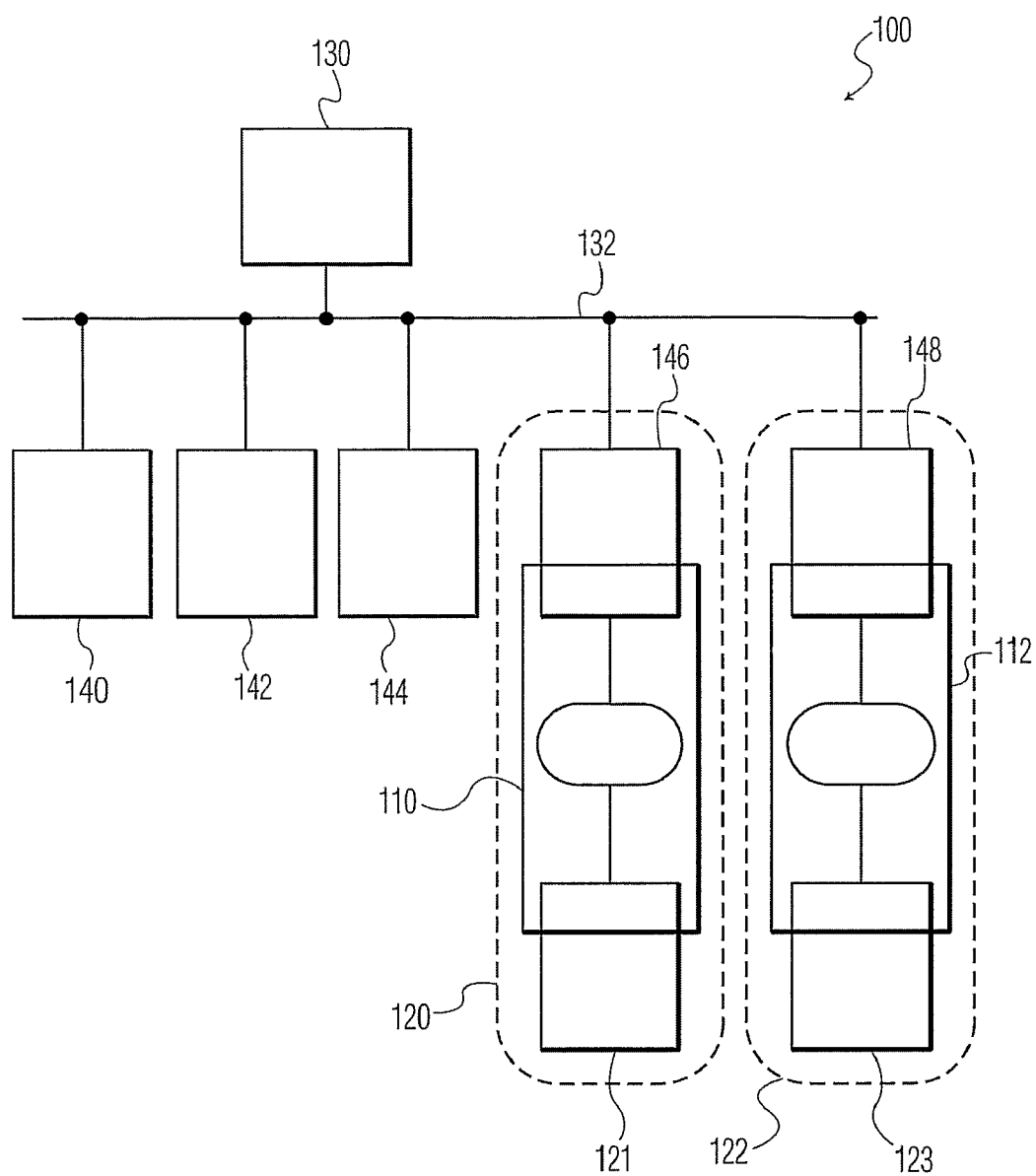
FIG. 1 is a block diagram showing an arrangement for implementing a device endpoint in connection with a PCI Express internal bus, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of circuits and approaches involving electronic communications, and in particular to those involving communications between an endpoint-type device and a communications bus (e.g., within a PCI Express HUB). While the present invention is not necessarily limited to such applications, an appreciation of various aspects of the invention is best gained through a discussion of examples in such an environment.

According to an example embodiment of the present invention, an integrated PCI Express endpoint device simulates a PCI Express link to emulate a downstream port of a switch connected via a PCI Express-compliant link to an endpoint device. The PCI Express link emulates a PCI-type link (e.g., a PCI to PCI Express bridge) that the PCI Express bus is adapted to communicate with. With this approach, the PCI Express endpoint device can be connected to the PCI Express bus while simulating the existence of a PCI Express-compliant link between the endpoint device and the bus. In addition, this approach facilitates the implementation of the integrated PCI Express endpoint device alongside PCI Express endpoint devices connected to the bus via the downstream port of a switch.

In one implementation, the integrated PCI Express endpoint device has registers that facilitate connection to the internal bus of the PCI Express HUB while, meeting requirements of the PCI Express Standard. Specifically, the PCI Express Device is an integrated endpoint device that uses registers to virtually appear as two separate devices (a downstream switch port and an endpoint device), facilitating compliance with PCI Express specification requirements relating to the general prohibition of endpoint devices appearing on an internal bus.

The registers that emulate, from a software perspective, one or more of the following: registers that are unique to each virtual device; registers that are shared between the virtual devices; registers that are read only all zeros (but are not implemented functionally but appear to exist from a software perspective); and registers that control the virtual link between the virtual devices, with minimal link emulation logic to make it appear as if a real link exists. The register(s) that are not functionally implemented facilitate the implementation of the PCI Express Device in a manner that addresses requirements of the PCI standard while generally not inhibiting the simplicity of a virtual link between the device and the HUB. For example, non-functional registers are implemented to emulate the virtual link that complies with PCI Express standards. In some instances, one or more of the above-discussed registers contain fields that exhibit a combination of the above categories. In one such example, a single register includes nonfunctional read only zero fields/bits and fields that are used functionally.

Turning now to the figures, FIG. 1 shows a PCI Express arrangement 100 configured for PCI Express endpoint device integration with an internal PCI Express bus, according to another example embodiment of the present invention. The arrangement 100 includes a PCI Express switch (i.e., a logical implementation of a switch) having an upstream port 130 coupled to a bus 132 and a plurality of downstream switch ports 140, 142, 144, 146 and 148. The upstream port 130 and the bus 132 of the switch may be implemented, for example, within a component that also contains a host bridge. An integrated PCI Express endpoint device 120 includes, from a logical perspective, a downstream port of a switch 146 coupled to a PCI Express endpoint device 121 by a virtual link 110. Specifically, the integrated PCI Express endpoint device 120 is a single block adapted to simulate two separate blocks (the downstream port 146 and the PCI Express endpoint device 120) attached in hierarchy (by virtual link 110). By way of example, another integrated PCI Express endpoint device 122 is shown having characteristics that are similar to integrated PCI Express endpoint device 120 (simulating downstream port 148 coupled to PCI Express endpoint device 123 via virtual link 112).

From a software perspective, the PCI Express endpoint device 121 effectively appears to be an external block connected with a dedicated PCI Express link (virtual link 110) to downstream port 146 (and in turn connected to an internal bus 132). The virtual link 110, while appearing to be a dedicated PCI Express link, has different functional requirements than would a dedicated PCI Express link. For example, there is no requirement to serialize the connection across the virtual link 110 because the link is virtual, no requirement to provide error recovery and no requirement for physical logical layer or physical electrical layer functions to cross between two chips. The use of the internal virtual links 110 and 112 alleviate the need for much of the functionality normally required for managing and controlling a PCI Express Link.

In one implementation, the virtual link 110 reduces and/or eliminates logic typically required for the implementation of PCI Express functions using a dedicated PCI Express link. For instance, functions related to the transaction layer, data link layer and physical layer of both logical endpoints (downstream port 146 and PCI Express endpoint device 121) served by the virtual link 110, as typically required for dedicated PCI Express links, are not necessary. For more information regarding the above-mentioned functions as implemented in connection with dedicated PCI Express links, and regarding "PCI-Express compliant" applications, reference may be made to "PCI Express Base Specification Revision 1.0a," April 2003, available from PCI-SIG (PCI-special interest group) of Portland, Oreg. Approaches that are compliant with this PCI Express Base Specification can be considered "PCI Express-compliant."

In another implementation, the integrated PCI Express endpoint device 120 includes configuration registers that share bits for the downstream port (146) and endpoint (121) functions. Sharing bits in this manner facilitates a degree of efficiency not available using an actual dedicated PCI Express link between two separate blocks, thus reducing complexity relative to that exhibited by such a dedicated PCI Express link arrangement. With this approach, relatively few register bits are required to maintain compatibility with software drivers implemented for PCI Express communications. FIGS. 4A-6 below discuss registers and other components that may be implemented in connection with the PCI Express arrangement 100 for simulating components, links and for other purposes.

Figure 2:
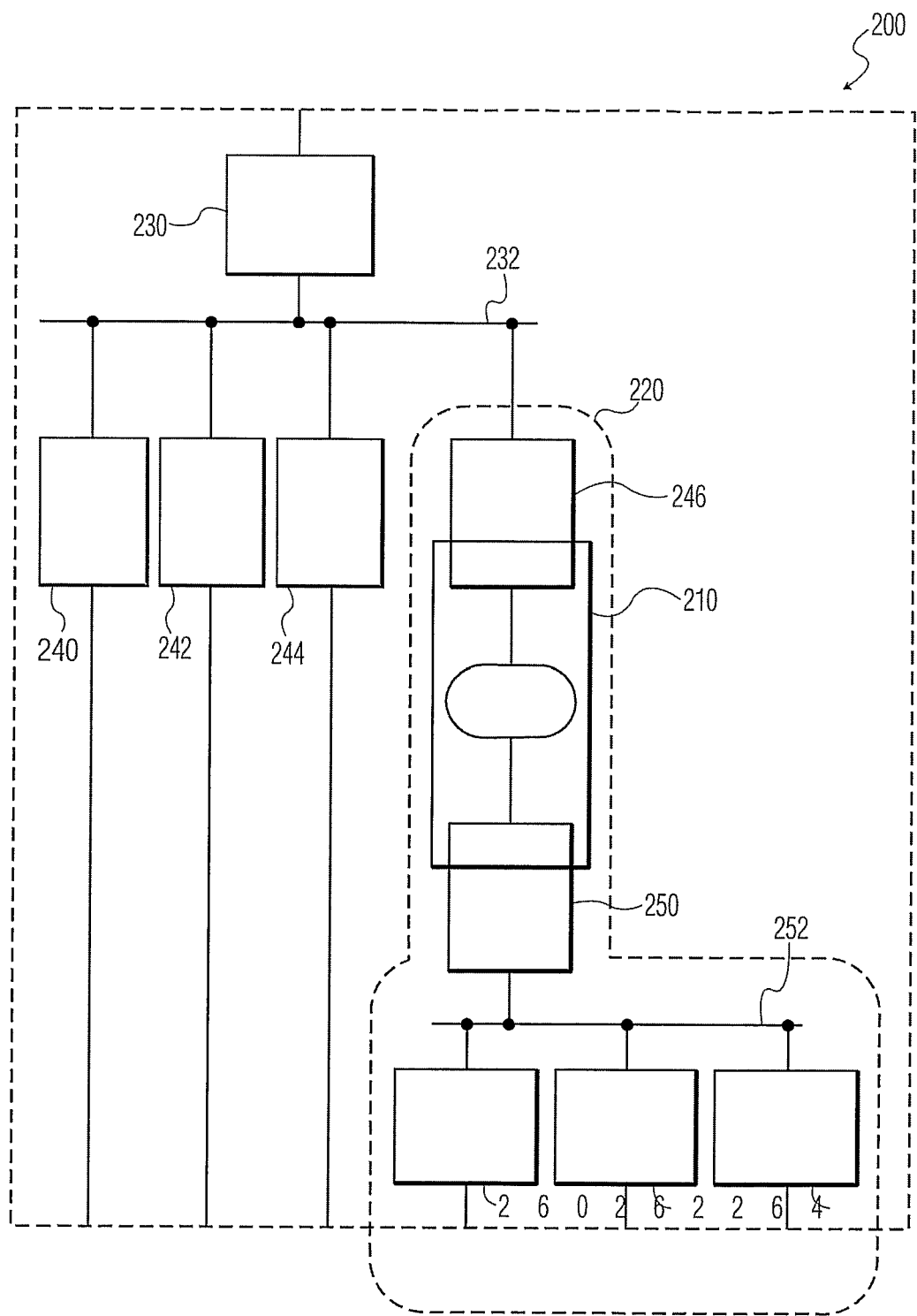
FIG. 2 is a block diagram showing an arrangement for implementing a device endpoint in connection with a PCI Express internal bus, according to an example embodiment of the present invention.

FIG. 2 shows a PCI Express arrangement 200 configured for device-PCI Express integration, according to another example embodiment of the present invention. The embodiment shown in FIG. 2 is similar to that shown in FIG. 1, with multiple PCI devices being coupled to a bus by way of a single virtual link 210 (rather than each virtual link coupling the bus to a single PCI endpoint device). An upstream port 230 of a switch is coupled by way of a PCI Express bus 232 to downstream ports 240, 242, 244 and 246, with downstream port 246 being integrated within an integrated PCI Express endpoint arrangement 220.

The integrated PCI Express endpoint arrangement 220 includes a circuit block that simulates distinct components coupled by a virtual link 210 and a virtual (PCI) bus 252. Specifically, a plurality of PCI devices including devices 260, 262 and 264 are coupled to a PCI Express to PCI bridge component 250 by the virtual bus 252. The PCI Express to PCI bridge 150 is coupled to a downstream port 246 by the virtual link 210. With this approach, the integrated PCI Express endpoint arrangement 220 can exist on the (internal) PCI Express bus 232 because the simulated components and virtual link (and bus) comply with PCI Express requirements. As discussed above in connection with FIG. 1, various components required with distinct components coupled to a PCI Express bus in a manner similar to that of the simulated components shown are relatively more complex and accordingly require more resources than the integrated PCE Express endpoint arrangement 220. By combining these components (e.g., registers) into a single block, fewer components are used, relative to implementing the same devices with separate blocks. In addition, a relatively simple legacy software model can be implemented for controlling the PCI Express arrangement 200, which is particularly useful when multiple PCI Devices are used.

Figure 3:
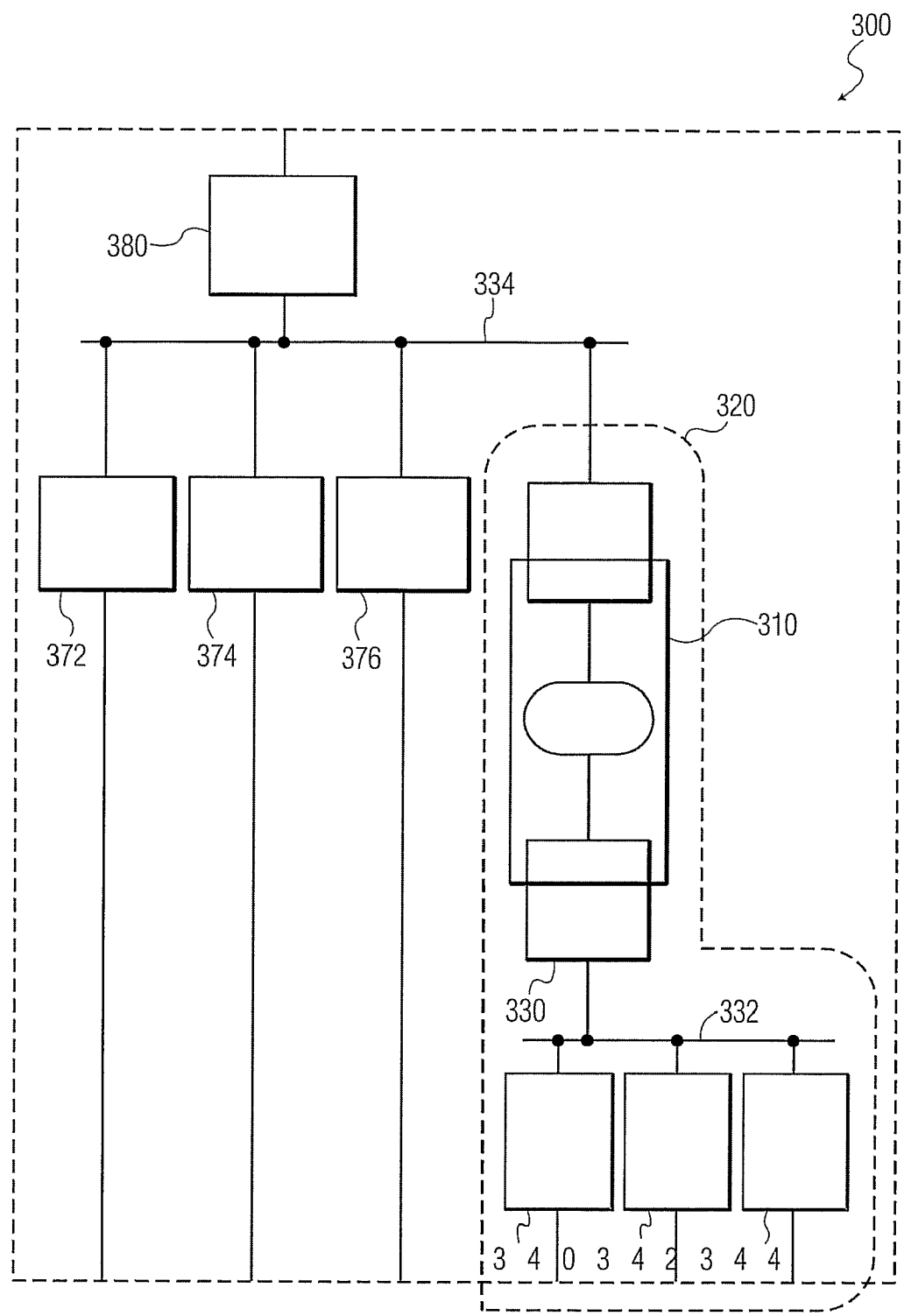
FIG. 3 is a block diagram showing an arrangement for implementing a device endpoint in connection with a PCI Express internal bus, according to an example embodiment of the present invention.

FIG. 3 shows a PCI Express arrangement 300 configured for device-PCI Express integration, according to another example embodiment of the present invention. In this embodiment, a PCI Express HUB (with a virtual PCI Express bus 332) is located lower in hierarchy than a PCI Express to PCI bridge 380. Specifically, The PCI Express to PCI bridge 380 is coupled to integrated PCI devices 372, 374 and 376, and to an integrated arrangement 320, by a PCI bus 334.

The integrated arrangement 320 is a single block having functionality that simulates separate blocks coupled by virtual link 310 and a PCI Express bus 332. Specifically, a PCI to PCI Express bridge 320 is coupled to an upstream port 330 of a switch by a virtual link 310. The upstream port 330 is coupled to downstream ports 340, 342 and 344 by the PCI Express bus 332. Various ones of these components may be implemented in a manner similar, for example, to that discussed in connection with similar components in FIG. 1. For instance, the virtual link 310 can be implemented in a manner similar to the virtual link 110. In addition, shared configuration registers can be implemented in a manner similar to that with FIG. 1 (and also as described further below in connection with FIGS. 4A-6). With this approach, a PCI Express-compliant solution is facilitated and PCI Express-type software should successfully enumerate arrangement.

Figure 4A:
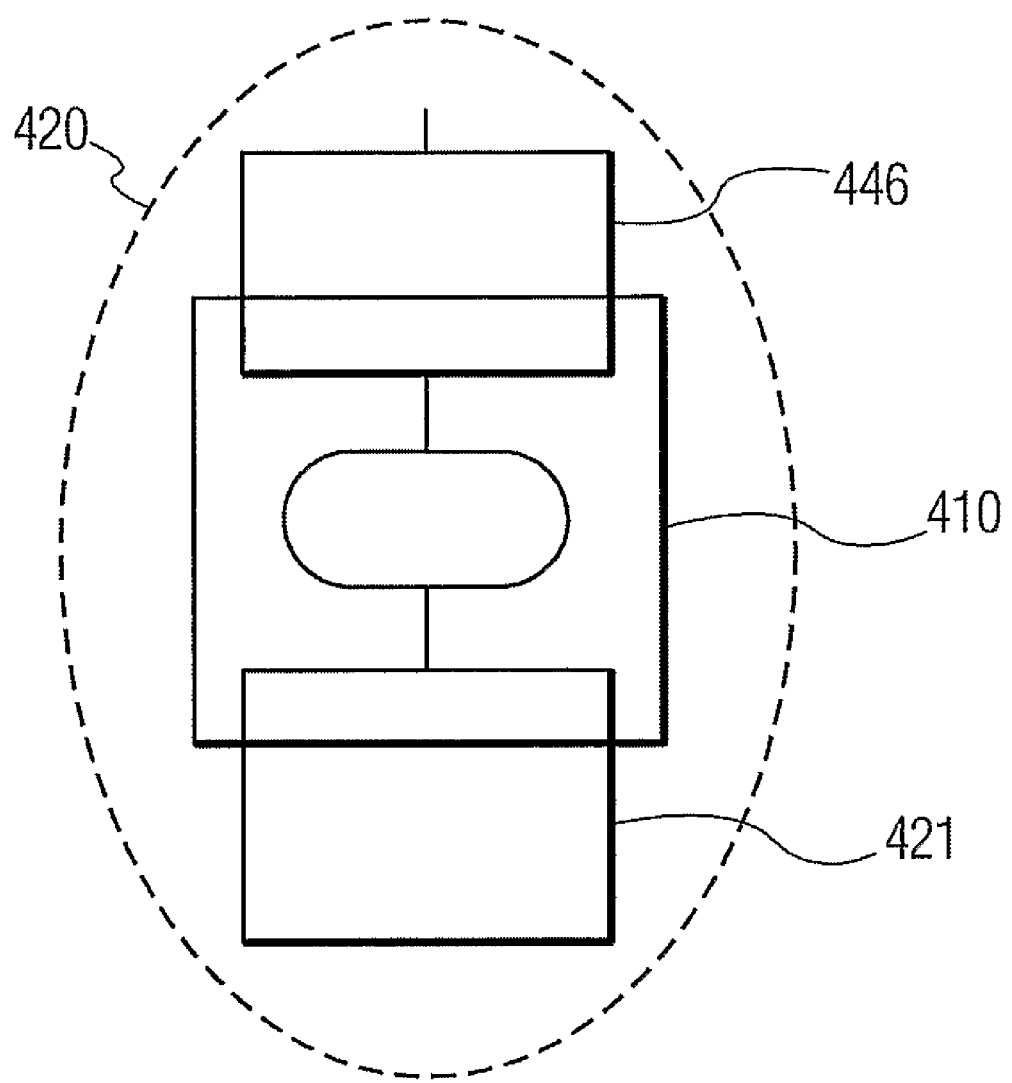
Figure 4B:
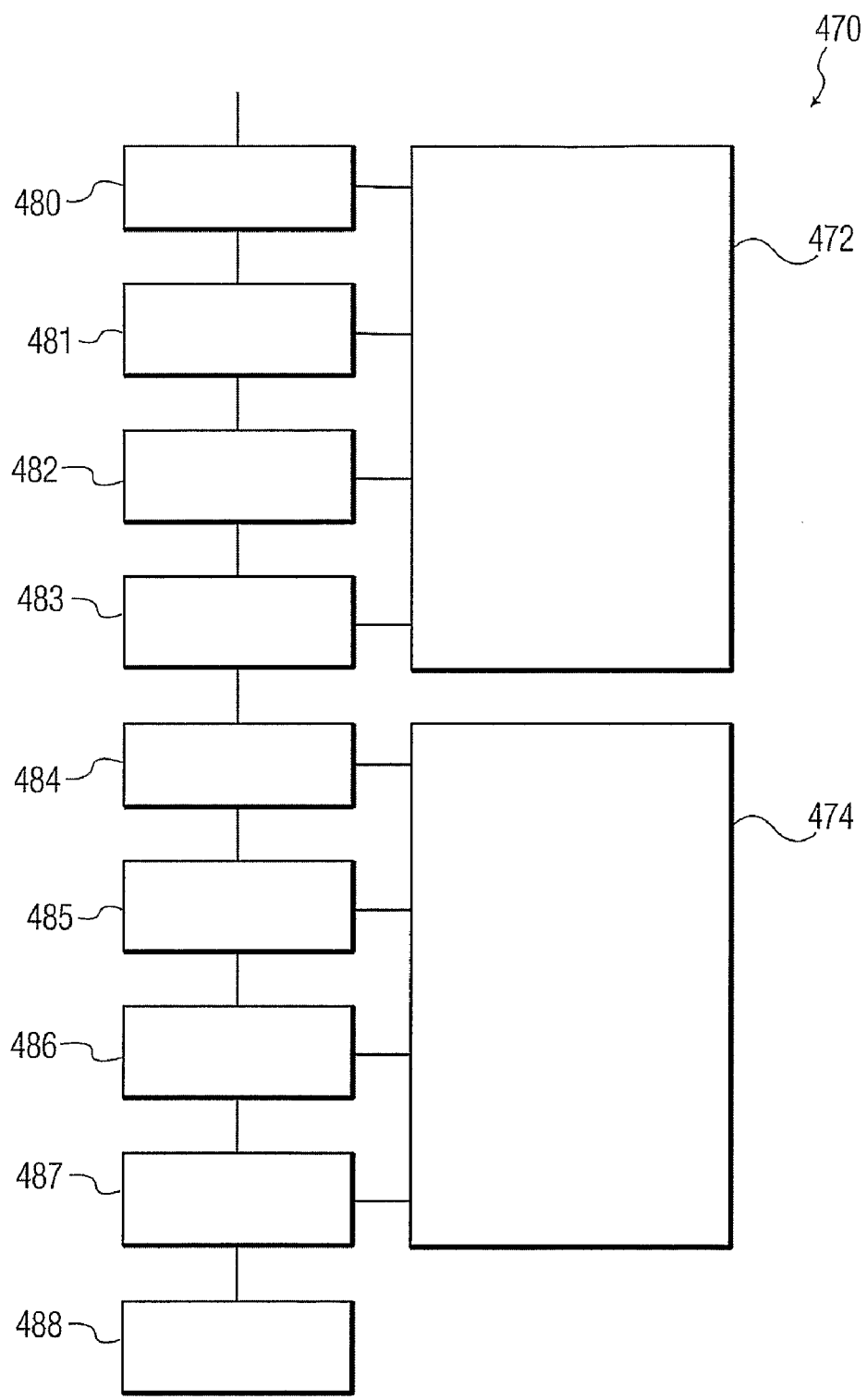
Figure 4C:
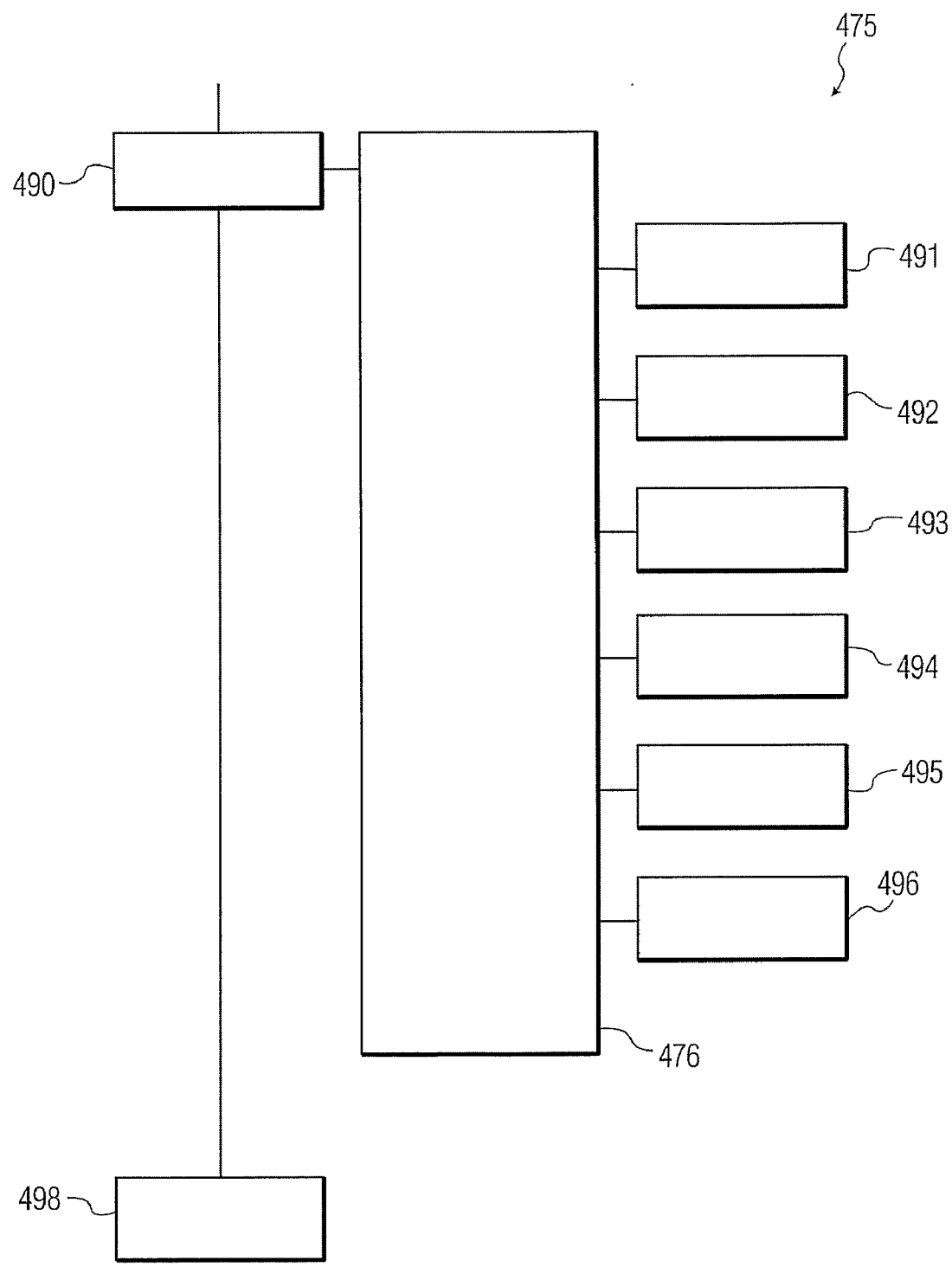

FIGS. 4A-4C show software and implementation views of an integrated device 420, according to another example embodiment of the present invention. The integrated device 420 has simulated blocks including downstream port 446 and PCI Express endpoint 421 coupled via a virtual link 410. The virtual link 410 may be implemented, for example, in connection with the virtual links 110, 210 and 310 respectively shown in FIGS. 1, 2 and 3, along with the simulated blocks they connect. The virtual link 410 appears to software to be a real PCI Express link, with downstream port 446 and PCI Express endpoint 421 correspondingly appearing to be distinct blocks. The virtual link 410 can be placed in low power modes, appears to have two complete sets of configuration registers and appears in all ways to software to be a fully functioning link. However, typical PCI Express components including transaction, data link, and physical layers are not implemented. In their place are small blocks of logic that emulate, from the configuration view, the operation of these functions.

From a software perspective, the layers of the PCI Express links as shown in FIGS. 4B and 4C are emulated to the extent that software will appear to see a fully operational link. This emulation may be simplified, for example, by assuming that no errors occur and that all blocks are always ready. In some instances, minimum functionality is supported in order to reduce the complexity of the simulation. For instance, slots and optional power management may be left unsupported and optional extended registers left unavailable.

Referring to FIG. 4B, a software view is shown for downstream port 446 and PCI Express endpoint device 410 of the integrated device 420 of FIG. 4A, with downstream port configuration registers 472 and PCI Express endpoint configuration registers 474. The downstream port layers include adapter 480, transaction layer 481, data link layer 482 and physical layers 483. The PCI Express endpoint layers include physical layers 484, data link layer 485, transaction layer 486 and adapter 487 that is coupled to IP 488 (an application block of intellectual property, such as a video device, audio device or disk controller). The adapters 480 and 487 translate between the IP's bus and packets, provides access to the configuration registers and generates messages for interrupts.

FIG. 4C shows a software view of the virtual link 410 of the integrated device 420, with an adapter 490 and I.P. 498, and virtual link configuration registers 476 coupled to the adapter 490. The virtual link configuration registers 476 include transaction emulation register 491, data link emulation register 492, physical emulation register 493, physical emulation register 494, data link emulation register 495 and transaction emulation register 496.

Each of the transaction, data link and physical layers are not implemented (e.g., are null blocks) but rather simulated for compatibility with PCI Express. For emulation of the data link layers 482 and 485, the adapters 480 and 487 are respectively disabled (prevented from generating any new cycles) in response to a link disable condition being asserted.

For emulation of the physical layers 483 and 484, a PME_TO_Ack message is generated to support allowing the HUB to gather up all PME_TO_Ack's and complete the return of this aggregate version upward in the hierarchy represented in the software view. This emulation with PME_TO_Ack messages may involve, for instance, a shutdown process initiated by a PME_Turn_Off message sent by a processor at the top of the hierarchy. Each endpoint device responds to the PME_Turn_Off message by generating a PME_TO_Ack message when it is ready to turn off. These PME_TO_Ack messages are gathered at the HUB, which responds to the processor (or other upstream device) with a single PME_TO_Ack message when all devices downstream of the HUB have responded with a PME_TO_Ack message.

In one implementation, the PCI Express HUB (e.g., including bus 132 when implemented with FIG. 1) functions with the assumption that a virtual port does not respond and the dependency upon this port is removed. For instance, when a particular port is for a non-functional device, there is no need to wait for the non-functional device to be ready to turn off, because it is always ready to turn off. In this instance, the HUB does not wait for this virtual port to respond before generating a PME_TO_Ack message for an upstream device, as discussed in the paragraph above. The physical layer powers on to a ready and configured state with many of the constants presented in the configuration summary being arbitrary. In this regard, the L1 exit time function (the time it takes a physical layer to recover from a low power state) associated with typical PCI Express implementations is generally not used for virtual devices. The physical layer makes transitions without any delay, as actual training time is zero. An active state condition is academic, as the software has no view of the autonomous active state power management; thus, active state conditions are ignored and have no impact on behavior of the arrangement 470. PCI Express "D" states (software states that set an "L" hardware state) are implemented as a Read/Write register, with a requested state being immediately selected (D0 and D3 states are supported). In addition, PCI Express-type request "PM_Active_State_Request_L1" is typically not generated.

Figure 5:
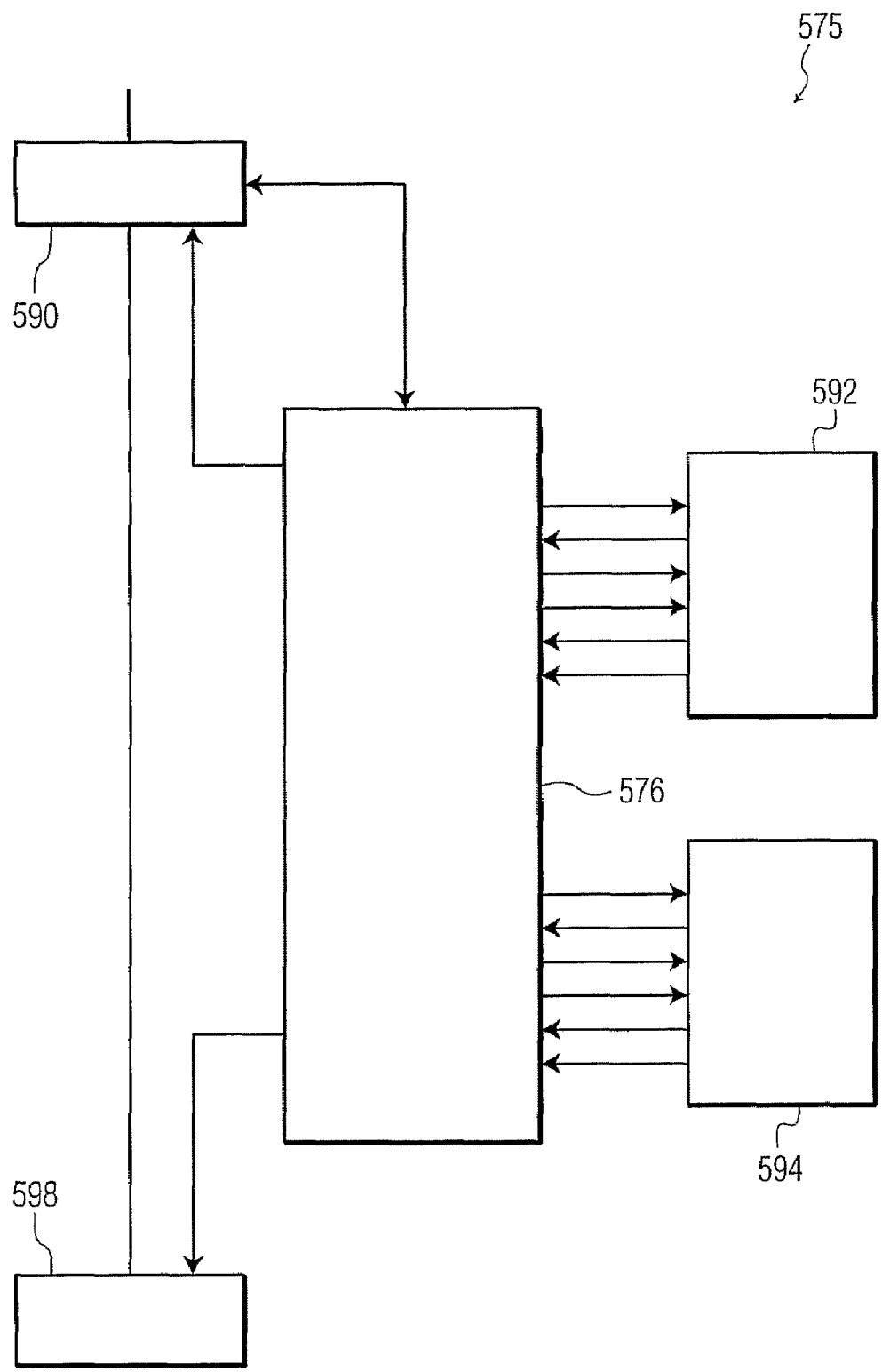
FIG. 5 shows an implementation view of a virtual link using emulation state machines for the device shown in FIG. 4A, according to another example embodiment of the present invention.

FIG. 5 shows another software implementation view of the virtual link 410 (similar, e.g., to the view shown in FIG. 4C), according to another example embodiment of the present invention. An adapter 590 and I.P. 598 function with virtual link configuration registers 576 to emulate the downstream port 446 and PCI Express endpoint device 421 with the virtual link 410 separating them. Up link and down link emulation state machines 592 and 594 interacts with configuration bits for emulating transaction, data link and physical layer functions. In some instances, the up link and down link emulation state machines 592 and 594 are integrated into a single emulation block for all layers.

The registers shown in the figures and discussed above are implemented using one or more of a variety of arrangements. In one example embodiment of the present invention, one or more configuration registers are combined. Referring to FIG. 4B as an example, registers for the transaction layer 481 and the data link layer 482 can be combined. Non-functional registers and bits implemented for simulation purposes are zero by design, and registers that are not implemented return zero by design.

In one implementation, registers and accompanying circuitry are configured such that, if no selection is made, a zero result is generated (i.e., if an undefined or a one is not selected). This approach can be implemented, for example, by dedicating an input at each mux to a 0 or, more simply, by using a standard 'AND' 'OR' tree to select registers. In this 'AND' 'OR' tree, one register has its output selected via an AND gate. All register outputs are 'ORed' together, and the result is the selected gate. If no gate is selected, all 'OR' inputs are 0, guaranteeing a zero result of any register that is not implemented. Similarly, all un-implemented bits in implemented registers will return a '0'.

The register to be implemented (e.g., shared, switch port, or device register) is selected in one or more of a variety of manners. For example, some registers have a unique register for the switch port and a unique register for the device. The switch port register is selected when a configuration cycle is a type 0 and the destination address matches the switch port's device number. The device register is selected when a configuration cycle is a type 1, is within the switch ports programmed bus range and matches the device's identification (ID). The type 1 to type 0 cycles are translated in a manner that is compatible with PCI requirements. A shared register is selected by implementing an 'OR' with the two above mechanisms involving the switch port and the device register.

One type of shared register that can be implemented using an approach similar to that discussed above is a vendor ID register. This register is selected when either the switch port register or the device register is read. It is shown in the register table with a single entry that has an X in both the D switch and device columns. Various other types of shared registers can be similarly implemented.

Figure 6:
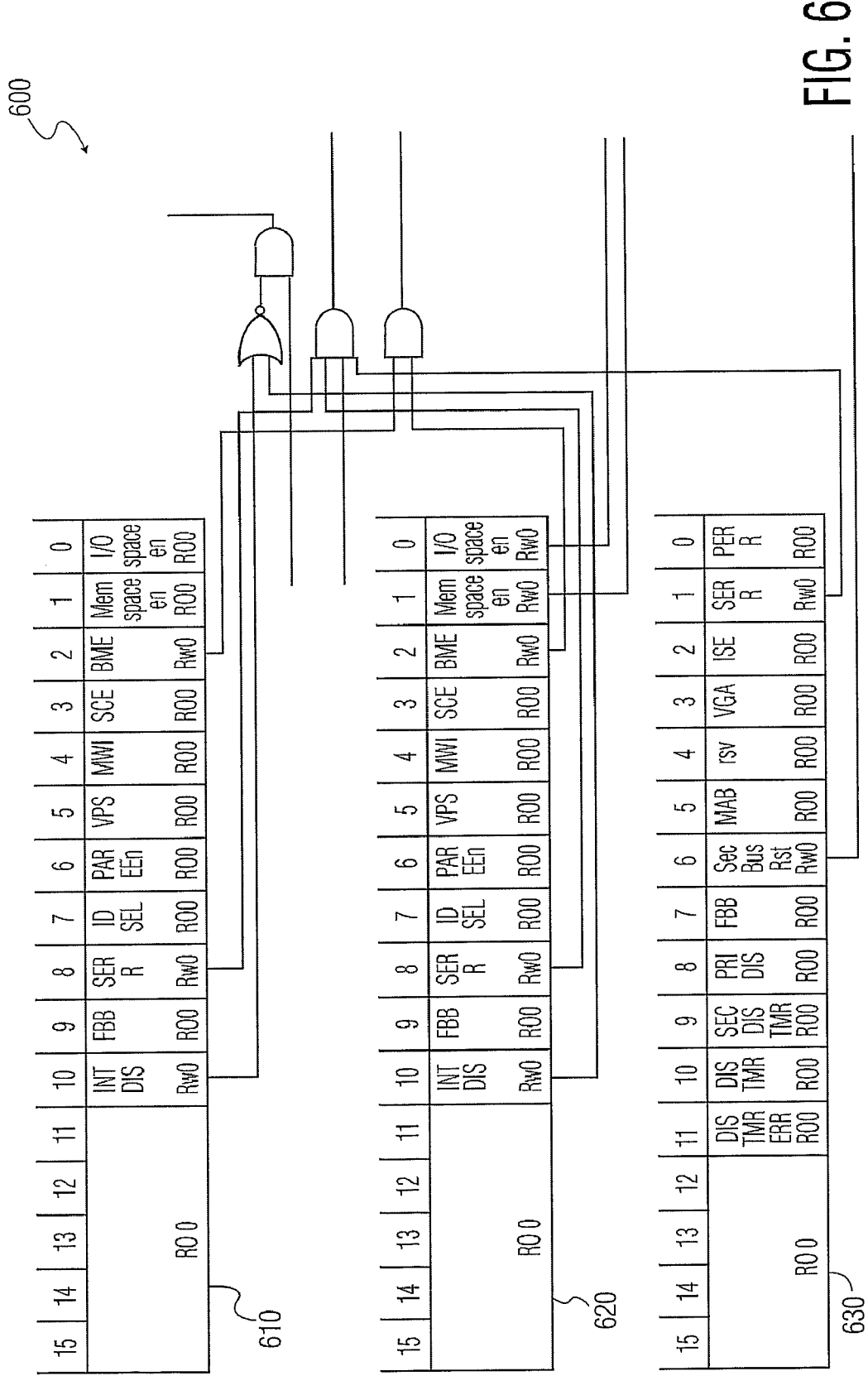
FIG. 6 shows a register arrangement for an integrated PCI Express endpoint device, according to another example embodiment of the present invention.

FIG. 6 shows a command register arrangement 600, according to another example embodiment of the present invention. The command register is used as an example of two distinct virtual registers (with other types of registers being readily implemented in a similar manner involving distinct virtual registers). For PCI Express, bits 15:11,9,7,5:2 are read only bits and are not implemented; therefore these bits always return all zeros. Bit 10, Interrupt Enable, can be used to disable or enable the propagation of the interrupt. Disabling either bit will disable the interrupt propagation. For more information regarding these bit implementations, reference may be made to the PCI Express base specification discussed above.

For each of the command registers 610 and 620, the RO 0 (Read Only fixed 0 output) bits are not implemented in the hardware (with the used bits being implemented). In this instance, 48 bits are shown and only 10 bits are implemented. Registers 610 and 620 at the top of the page depict registers that represent two distinct registers that are at the same location. When an interrupt disable function is implemented, either the INT DIS bit in the command registers of the PCI Express device or the same bit in the command register of the downstream port of a switch is set to block the INT signal. In one implementation, this is achieved using the OR gate discussed above, combining two disable signals so that the INT will be blocked when either or both of the disable bits are asserted. The AND gate following the OR gate disables the INT if either or both of the INT DIS bits are set. The Bus Master Enable enables this device's bus master if both the Bus Master Enable bits in both of the registers are set (the two input NAND gate shown above). Bus Control Register 620 implements 2 bits to be implemented, one of which, SERR, also has control bits in the other two control registers shown. Any one of these bits can block the signal system error output regardless of where SERR is disabled in this virtual hierarchy.

Table 1 below shows an approach using a shared register set, according to another example embodiment of the present invention. The information shown in Table 1 may be implemented, for example, in connection with FIG. 6 discussed above.

TABLE 1

| Shared register set, Downstream Port of a Switch and Device with Virtual Link | | | | | | |
|---|---|---|---|---|---|---|
| Address | Offset | Register | Description | D. Switch | Device | Note |
| | | | Type 0/1 | | | |
| 0x00 | 0x00 | VID | Vendor ID | X | X | Shared RO Register |
| 0x02 | 0x02 | DID | Defice ID | X | | Device ID for D. port of a Switch |

TABLE 1-continued

Shared register set, Downstream Port of a Switch and Device with Virtual Link

| Address | Offset | Register | Description | D. Switch | Device | Note |
|---|---|---|---|---|---|---|
| 0x02 | 0x02 | DID | Device ID | | X | Device ID for Device, note 1 |
| 0x04 | 0x04 | CMD | Command Register | X | | Special, see text |
| 0x04 | 0x04 | CMD | Command Register | | X | Special, see text |
| 0x06 | 0x06 | STS | Status Register | X | | Special, see text |
| 0x06 | 0x06 | STS | Status Register | | X | Special, see text |
| 0x08 | 0x08 | RID | Revision ID | X | X | Shared |
| 0x09 | 0x08 | CC | Class Code | X | X | Shared |
| 0x0C | 0x0C | CLS | Cache Line | | | RO 0 |
| 0x0D | 0x0D | MLT | Master Latency Timer | | | RO 0 |
| 0x0E | 0x0E | HT | Header Type | | | RO 0 |
| 0x0F | 0x0F | BIST | Built-in Self Test | | | RO 0 |
| 0x10 | 0x10 | BAR0 | Base Address Register 0, fixed 0 | | | RO 0 |
| | 0x10 | BAR0 | Base Address Register 0, customer defined constant | | X | |
| 0x14 | 0x14 | BAR1 | Bass Address Register 1, fixed 0 | | | RO 0 |
| | 0x14 | BAR1 | Base Address Register 1, customer defined constant | | X | |
| 0x18 | 0x18 | Pri-Bus# | Primary Bus Number, RW, default 0 | X | | |
| | 0x18 | BAR 2 | Base Address Register, Customer to define. | | | RO 0 |
| 0x19 | 0x19 | Sec-Bus# | Secondary Bus Number, RW, dafault 0 | X | | |
| | 0x19 | | Reserved, all zeros | | | RO 0 |
| 0x1A | 0x1A | Sub-Bus# | Subordinate Bus Number, RW, default 0 | X | | |
| | 0x1A | | Reserved, all zeros | | | RO 0 |
| 0x1B | 0x1B | Sec-LT | Secondary Latency Timer, Reserved, all zeros | X | | RO 0 |
| | 0x1B | | Reserved, all zeros | | | RO 0 |
| 0x1C | 0x1C | I/O Base | I/O Base, software allocation only | X | | |
| | 0x1C | | Reserved, all zeros | | | RO 0 |
| 0x1D | 0x1D | I/O Limit | I/O Limit, software allocation only | X | | |
| | 0x1D | | Reserved, all zeros | | | RO 0 |
| 0x1E | 0x1E | Sec-STS | Secondary bus status | X | | |
| | 0x1E | | Reserved, all zeros | | | RO 0 |
| 0x20 | 0x20 | MEM Base | Memory Base, RW, used by switch | X | | |
| | 0x20 | | Reserved, all zeros | | | RO 0 |
| 0x22 | 0x22 | MEM Limit | Memory Limit, RW, used by switch | X | | |
| | 0x22 | | Reserved, all zeros | | | RO 0 |
| 0x24 | 0x24 | PMEM Base | Prefetchable Memory, fixed all zeros | | | RO 0 |
| | 0x24 | | Reserved, all zeros | | | RO 0 |
| 0x26 | 0x28 | PMEM Limit | Prefetchable Memory Limit, fixed all zeros | | | RO 0 |
| | 0x26 | | Reserved, all zeros | | | RO 0 |
| 0x28 | 0x28 | PMEM Base | Prefetchable Memory Base (upper 32-bits), fixed 0 | | | RO 0 |
| | 0x28 | CIS | Card Information Struct, not used, fixed 0 | | | RO 0 |
| 0x2C | 0x2C | PMEM Limit | Prefetchable Memory Limit (upper 32-bits) | | | RO 0 |
| | 0x2C, 0x2E | SVID, SID | Subsystem Vendor ID, Subsystem ID. | | X | constant lbd |
| 0x30 | 0x30 | I/O Base, I/O Limit | I/O Base (upper 16 bits), I/O Limit (upper 16 bits) RW, used in a switch | | | RO 0 |
| | 0x30 | ROM BAR | ROM base address. Not used. | | | RO 0 |
| 0x34 | 0x34 | CAP PTR | Capabilities Pointer | X | X | Shared |
| 0x35-0x37 | 0x35-0x37 | | Reserved, all zeros | | | RO 0 |
| 0x38 | 0x38 | ROM BAR | Expansion ROM base address, Reserved, all zeros | | | RO 0 |
| | 0x38 | | Reserved, all zeros | | | RO 0 |
| 0x3C | 0x3C | INT LINE | Interrupt Line | | | RO 0 |
| 0X3D | 0x3D | INT PIN | Interrupt Pin | | | RO 0 |
| 0x3E | 0x3E | BCR | Bridge Control Register | X | | |
| 0x3E | 0x3E | MIN GNT | Min Grant, not used. | | | RO 0 |
| 0x3F | 0x3F | MAX LAT | Max Latency, not used | | | RO 0 |
| | | | MSI | | | |
| 0x40 | 0x00 | Message Control | | X | | |
| 0x44 | 0x04 | Message Address | | X | | |
| 0x4B | 0x0B | Message Upper Address | Message Upper Address | X | | |

TABLE 1-continued

Shared register set, Downstream Port of a Switch and Device with Virtual Link

| Address | Offset | Register | Description | D. Switch | Device | Note |
|---|---|---|---|---|---|---|
| 0x4C | 0x0C | Message Data | Message Data | X | | |
| | | | PCI Express Capabilities | | | |
| 0x50 | 0x0 | PCI Express Capability List Register | PCI Express Capability List Register | X | X | Shared |
| 0x52 | 0x2 | PCI Express Capabilities Reg | PCI Express Capabilities Register | X | | Most bite shared, port types are different |
| 0x52 | 0x2 | PCI Express Capabilities Reg | PCI Express Capabilities Register | | X | |
| 0x54 | 0x4 | Device Capabilities Register | Device Capabilities Register | X | X | Shared RO bits, phatom, max payload, latency fields equal for both blocks |
| 0x58 | 0x8 | Device Control Register | Device Control Register | X | X | Bits must be set the same, so share even control. Many bits are fixed RO. Assume no errors, (no link) |
| 0x5A | 0xA | Device Status Registers | Device Status Registers | | | RO 0 (assumes no errors) |
| 0x50C | 0x0C | Link Capabilities | Link Capabilities | X | X | Shared RO dummy fields |
| 0x60 | 0x10 | Link Control Register | Link Control Register | X | X | Shared. Bit 4 is RW but does nothing. Others are constants |
| 0x62 | 0x12 | Link Status Register | Link Status Register | X | X | RO bite, shared. |
| 0x64 | 0x14 | Slot Capabilities | Slot Capabilities | | | RO 0 |
| 0x68 | 0x18 | Slot Control | Slot Control | | | RO 0 |
| 0x6A | 0x1A | Slot Status | Slot Status | | | RO 0 |
| 0x6C | 0x1C | Root Control | Root control | X | | PMEint enable bit is only bit required |
| | 0x1C | na | Reserved, all zeros | | | RO 0 |
| 0x70 | 0x20 | Root Status | Root status | X | | |
| | 0x20 | na | Reserved, all zeros | | | RO 0 |
| | | | Power | | | |
| 0x74 | 0x0 | Power Management Capability | | | | not required |
| 0x78 | 0x4 | Power Management Status/Control | | | | not required |
| | | | Vendor Specific | | | |
| | | | vendor specific not required | | | |

What is claimed is:

1. An integrated endpoint device comprising: PCI Express endpoint circuitry configured and arranged to perform external PCI Express endpoint device block functions; PCI Express downstream port circuitry for communicating with a PCI Express bus and configured and arranged to perform downstream port functions; and simulation circuitry configured to simulate a PCI Express-compliant link between a PCI Express endpoint device and a PCI Express downstream port as respectively implemented by the PCI Express endpoint circuitry and the PCI Express downstream port circuitry.

2. The device of claim 1, further comprising: a merged configuration register configured to store information for use by the simulation circuitry and the PCI Express Endpoint circuit, the stored information facilitating the simulation of the PCI Express-compliant link.

3. The device of claim 1, wherein the simulation circuitry is configured to interface with software-implemented applications for simulating the PCI Express endpoint circuitry as an external block having a dedicated PCI Express link.

4. The device of claim 1, further comprising at least one non-functional register that is configured to simulate a register that characterizes a PCI Express-compliant device.

5. The device of claim 4, wherein the simulation circuitry is configured to implement the at least one non-functional register for PCI-Express type communications between the integrated endpoint device and a PCI-Express type communications link requiring the implementation of a register function to which the at least one non-functional register is implemented.

6. The device of claim 4, wherein the at least one non-functional register is configured to read only all zeros.

7. The device of claim 4, wherein the non-functional register is simulated to appear to exist from a software perspective.

8. The device of claim 4, wherein at least one non-functional register is unique to each external PCI Express Endpoint device block for which the PCI Express endpoint circuitry performs external functions.

9. The device of claim 4, wherein at least one non-functional register is unique to each simulated PCI Express-compliant link.

10. The device of claim 4, wherein at least one non-functional register is shared between at least two simulated PCI Express-compliant links.

11. The device of claim 1, wherein PCI Express endpoint circuitry is configured and arranged to perform PCI Express Endpoint device block functions for at least two PCI Express Endpoint blocks and wherein the simulation circuitry is configured to simulate and control a virtual link between the at least two PCI Express Endpoint blocks.

12. The device of claim 1, wherein the PCI Express downstream port circuitry is configured to communicate with a PCI Express HUB.

13. The device of claim 1, wherein the PCI Express downstream port circuitry is configured to communicate with a PCI Express type link for at least one of: a personal computer, a server and a network.

14. The device of claim 1, wherein the simulation circuitry is further configured to simulate the PCI Express-compliant link as including a PCI Express to PCI bridge and a PCI bus coupled to a plurality of PCI Express endpoint device blocks implemented by the PCI Express endpoint circuitry.

15. An integrated PCI Express endpoint device configured to appear on an internal bus of a PCI Express switch while facilitating PCI Express compliance, the device comprising: a hardware block configured and arranged to: perform functions of a downstream port of a PCI Express switch; perform functions of an endpoint device; and emulate a downstream port block and an endpoint device block coupled by a PCI Express-compliant link and with the emulated downstream port block performing the downstream port functions and the emulated endpoint device block performing the endpoint device functions; and a merged configuration register configured to store information for use by the hardware block in emulating and performing downstream port, endpoint device and PCI Express-compliant link functions.

16. An integrated endpoint device comprising: external block means for performing external PCI Express Endpoint device block functions; port means for communicating with a PCI Express bus and configured and for performing PCI Express downstream port functions; and simulating means for simulating a PCI Express-compliant link between a PCI Express endpoint device and a PCI Express downstream port as respectively implemented by the external block means and the port means.

17. A PCI Express communications system comprising: a central processor arrangement; a host bridge configured and arranged to communicate between the central processor arrangement and a PCI Express switch; a PCI Express switch comprising: an upstream port; a bus; and a plurality of downstream ports; a PCI Express endpoint device coupled to one of the downstream ports; and wherein the PCI Express endpoint device and the downstream port to which it is coupled are comprised in a single circuit that emulates the downstream port and the PCI Express endpoint device coupled via a virtual link.

18. The system of claim 17, further comprising a plurality of registers implemented for simulating characteristics of the emulated downstream port and the PCI Express endpoint device.

19. The system of claim 18, wherein at least one of the plurality of registers is a non-functional register implemented for emulating PCI Express-type functions.

20. A PCI Express communications system comprising: a PCI to PCI Express bridge; an upstream port; a plurality of downstream ports; and wherein the a PCI to PCI Express bridge, the upstream port and the downstream ports are comprised in a circuit that emulates a virtual link between the PCI to PCI Express bridge and the upstream port and that emulates a PCI Express bus linking the plurality of downstream ports with the upstream port.

* * * * *